United States Patent
Akamine et al.

(10) Patent No.: US 11,841,419 B2
(45) Date of Patent: Dec. 12, 2023

(54) STATIONARY AND MOVING OBJECT RECOGNITION APPARATUS

(71) Applicant: DENSO CORPORATION, Kariya (JP)

(72) Inventors: Yusuke Akamine, Nisshin (JP); Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 748 days.

(21) Appl. No.: 16/851,795

(22) Filed: Apr. 17, 2020

(65) Prior Publication Data

US 2020/0244840 A1 Jul. 30, 2020

Related U.S. Application Data

(63) Continuation of application No. PCT/JP2018/038528, filed on Oct. 16, 2018.

(30) Foreign Application Priority Data

Oct. 18, 2017 (JP) .................. 2017-201899

(51) Int. Cl.
| | | |
|---|---|---|
| *G01S 13/62* | (2006.01) | |
| *B60W 30/095* | (2012.01) | |
| *G01S 13/931* | (2020.01) | |
| *G01S 13/60* | (2006.01) | |
| *G01S 13/52* | (2006.01) | |

(52) U.S. Cl.
CPC ......... *G01S 13/62* (2013.01); *B60W 30/0956* (2013.01); *G01S 13/52* (2013.01); *G01S 13/60* (2013.01); *G01S 13/931* (2013.01); *G01S 2013/932* (2020.01); *G01S 2013/9322* (2020.01)

(58) Field of Classification Search
CPC .... B60W 30/0956; G01S 13/52; G01S 13/60; G01S 13/62; G01S 13/931; G01S 2013/932; G01S 2013/9322
See application file for complete search history.

(56) References Cited

U.S. PATENT DOCUMENTS 10,310,076 B2 * 6/2019 Mukai .................... G01S 13/86
2004/0143416 A1 7/2004 Hattori et al.
(Continued)

FOREIGN PATENT DOCUMENTS

JP 10-239436 A 9/1998
JP 2001-272466 A 10/2001
(Continued)

*Primary Examiner* — Donald H B Braswell
(74) *Attorney, Agent, or Firm* — MASCHOFF BRENNAN

(57) ABSTRACT

A moving object recognition apparatus includes an object detection section, a position detection section, a road direction estimation section, and a moving direction estimation section. The object detection section detects a moving object that moves on a road around an own vehicle and a roadside object by the road, from objects present around the own vehicle. The position detection section detects positions of the moving object and the roadside object detected by the object detection section. The road direction estimation section estimates a road direction of the road on which the moving object is moving, based on the position of the roadside object detected by the position detection section. The moving direction estimation section estimates a moving direction of the moving object based on the road direction estimated by the road direction estimation section.

15 Claims, 11 Drawing Sheets

(56) References Cited

U.S. PATENT DOCUMENTS

| | | | | |
|---|---|---|---|---|
| 2011/0295548 | A1* | 12/2011 | Takabayashi | G01S 13/931 |
| | | | | 702/150 |
| 2016/0161265 | A1* | 6/2016 | Bagheri | G01S 13/89 |
| | | | | 701/450 |
| 2018/0135972 | A1* | 5/2018 | Patel | G06T 19/006 |
| 2019/0226853 | A1* | 7/2019 | Kubiak | G01S 13/426 |
| 2022/0227367 | A1* | 7/2022 | Kario | B60W 30/0956 |

FOREIGN PATENT DOCUMENTS

| | | |
|---|---|---|
| JP | 2007-292643 A | 11/2007 |
| JP | 2011-220766 A | 11/2011 |
| JP | 2015-057686 A | 3/2015 |

\* cited by examiner

FIG.2
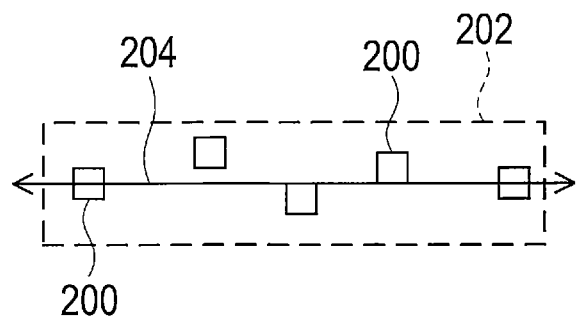
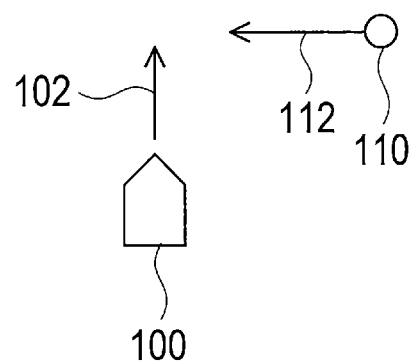
FIG.3
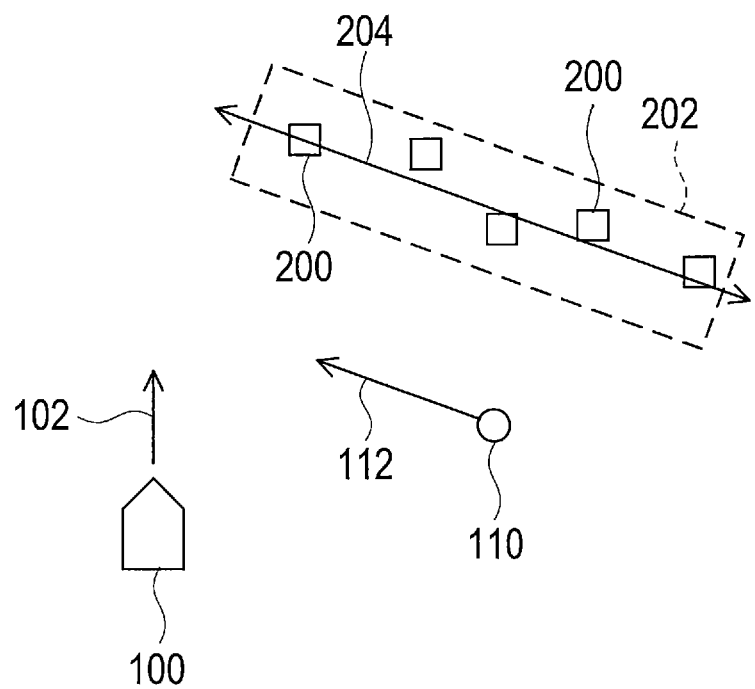

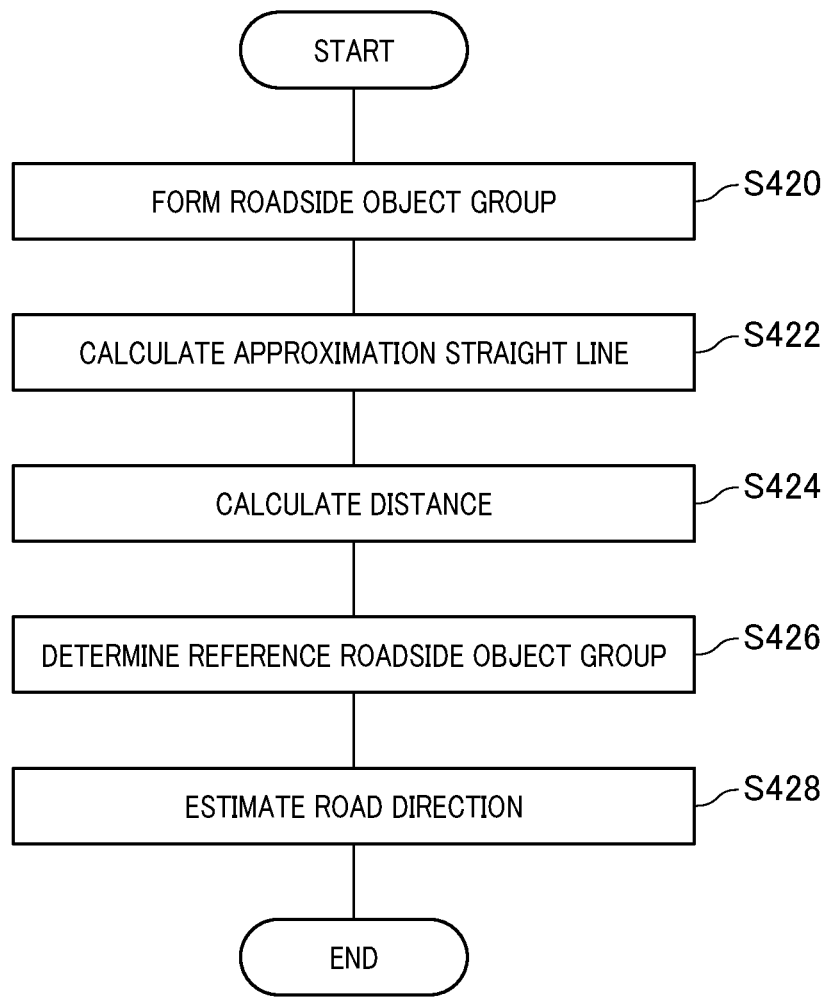

STATIONARY AND MOVING OBJECT RECOGNITION APPARATUS

CROSS-REFERENCE TO RELATED APPLICATION

The present application is based on and claims the benefit of priority from Japanese Patent Application No. 2017-201899 filed on Oct. 18, 2017, the description of which is incorporated herein by reference.

BACKGROUND

Technical Field

The present disclosure relates to a technique for estimating a moving direction of a moving object.

Related Art

Techniques for predicting movement of a moving object present around an own vehicle are known. For example, a technique for predicting movement of a target present around an own vehicle by using a prediction filter is disclosed. In the technique, linear regression processing is performed as a regression analysis of a plurality of pieces of positional information of a target detected during a predetermined time period from the time at which a search for the target starts, and the result is used as an initial value input to a prediction filter.

SUMMARY

As an aspect of the present disclosure, a moving object recognition apparatus for a vehicle is provided. The apparatus includes: an object detection section that is configured to detect a moving object that moves on a road around an own vehicle and a roadside object by the road, from objects present around the own vehicle; a position detection section that is configured to detect positions of the moving object and the roadside object detected by the object detection section; a road direction estimation section that is configured to estimate a road direction of the road on which the moving object is moving, based on the position of the roadside object detected by the position detection section; and a moving direction estimation section that is configured to estimate a moving direction of the moving object based on the road direction estimated by the road direction estimation section.

BRIEF DESCRIPTION OF THE DRAWINGS

In the accompanying drawings:

FIG. 2 is a schematic diagram showing a relationship among an own vehicle, a moving object, and a roadside object;

FIG. 3 is a schematic diagram showing another relationship among the own vehicle, the moving object, and the roadside object;

FIG. 13 is a flowchart of a road direction estimation process.

DETAILED DESCRIPTION OF THE PREFERRED EMBODIMENTS

Techniques for predicting movement of a moving object present around an own vehicle are known. For example, JP-A-2001-272466 discloses a technique for predicting movement of a target present around an own vehicle by using a prediction filter. In the technique, linear regression processing is performed as a regression analysis of a plurality of pieces of positional information of a target detected during a predetermined time period from the time at which a search for the target starts, and the result is used as an initial value input to a prediction filter.

However, the technique described in JP-A-2001-272466 requires detecting a plurality of pieces of positional information of a target during a predetermined time period from the time at which a search for the target starts to calculate an initial value input to a prediction filter by a regression analysis. Accordingly, detailed study by the inventor found a problem that responsiveness for predicting movement of a target is low.

If the number of times of detecting positional information of a target is decreased to decrease the predetermined time period, responsiveness increases. However, a detailed study by the inventor found a problem that if the number of times of detecting positional information of a target is decreased to decrease the predetermined time period, accuracy of an initial value input to a prediction filter to predict movement of the target decreases.

The present disclosure aims to provide a technique for estimating a moving direction of a moving object with high responsiveness while high accuracy is ensured.

Hereinafter, an embodiment of the present disclosure will be described with reference to the drawings.

[1. Configuration]

Figure 1:
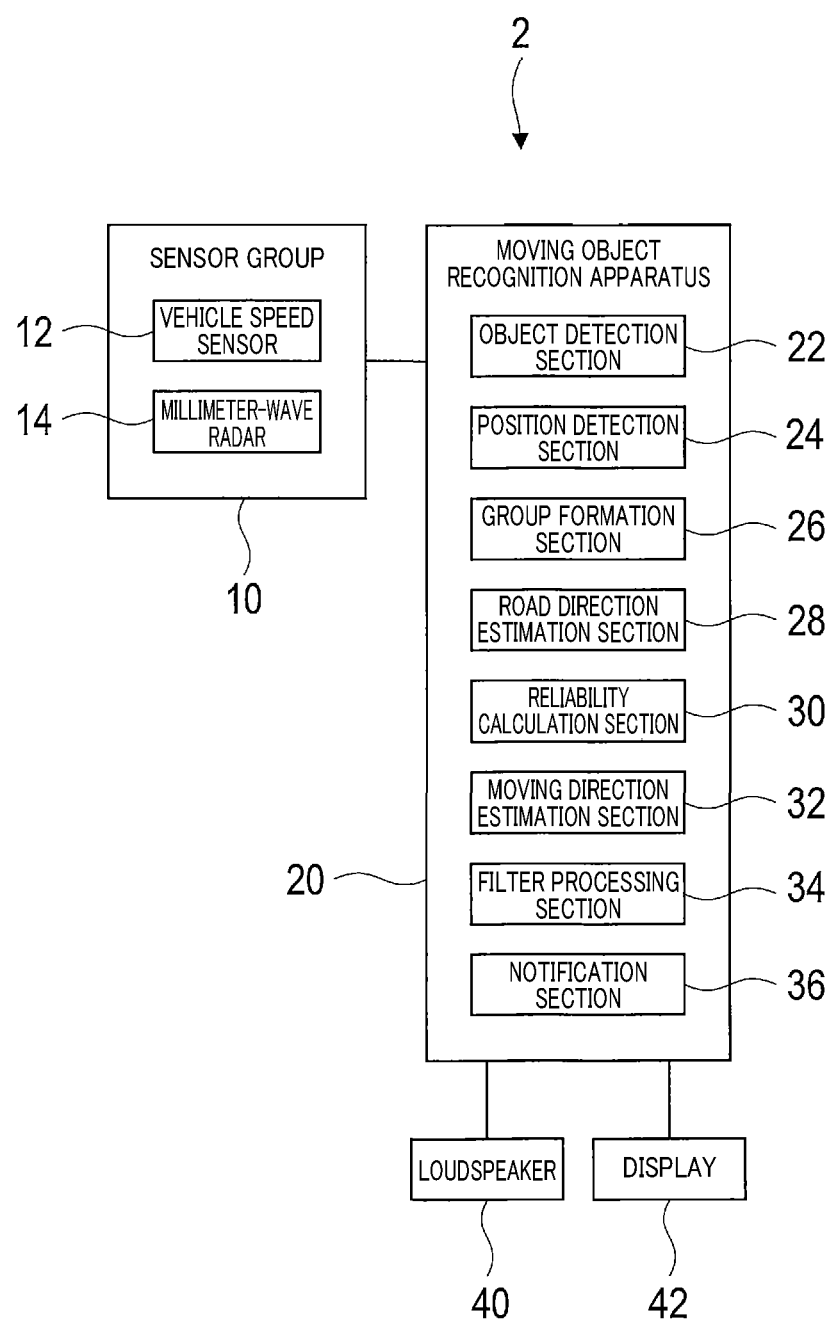
FIG. 1 is a block diagram showing a moving object recognition apparatus according to an embodiment.

An in-vehicle moving object recognition system 2 shown in FIG. 1 includes a sensor group 10, a moving object recognition apparatus 20, a loudspeaker 40, and a display 42. The sensor group 10 includes at least a vehicle speed sensor 12 and a millimeter-wave radar 14.

The millimeter-wave radar 14 outputs transmission waves frequency-modulated with a triangle wave from an antenna, and receives reflected waves from an object present around an own vehicle. The millimeter-wave radar 14 mixes the reflected waves to output a beat signal.

Since the beat signal waveform changes due to interference caused according to a distance to an object and a relative speed with respect to the object, a distance between the own vehicle and the object and a relative speed of the object with respect to the own vehicle can be calculated. Since reflected waves are received if the object is present in the transmission direction of transmission waves, the direction with respect to the own vehicle in which the object around the own vehicle is present can be detected. The relative position of the object with respect to the own vehicle can be determined based on the distance between the own vehicle and the object and the direction with respect to the own vehicle in which the object is present.

The moving object recognition apparatus 20 is mainly configured by a known microcomputer having a CPU and semiconductor memories such as a RAM, a ROM, and a flash memory. Various functions of the moving object recognition apparatus 20 are implemented by the CPU executing a program stored in a non-transitory tangible recording medium.

In this example, a semiconductor memory corresponds to the non-transitory tangible recording medium storing the program. Executing the program performs a method corresponding to the program. The moving object recognition apparatus 20 may be configured by a single microcomputer or a plurality of microcomputers.

The moving object recognition apparatus 20 includes, as components performing functions implemented by the CPU executing the program, an object detection section 22, a position detection section 24, a group formation section 26, a road direction estimation section 28, a reliability calculation section 30, a moving direction estimation section 32, a filter processing section 34, and a notification section 36.

The above elements configuring the moving object recognition apparatus 20 may be implemented by other than software. Some of or all of the elements may be implemented by using one or more hardware components. For example, when the above functions are implemented by electronic circuits, which are hardware, the electronic circuits may be implemented by digital circuits or analog circuits including a number of logic circuits, or a combination thereof.

The object detection section 22 determines a distance between the own vehicle and an object and a direction with respect to the own vehicle in which the object is present based on detection signals from the millimeter-wave radar 14. In addition, the object detection section 22 determines a relative speed of the object with respect to the own vehicle based on the detection signals from the millimeter-wave radar 14.

The object detection section 22 detects a moving object and a roadside object, which is a stationary object, present around the own vehicle based on a vehicle speed of the own vehicle acquired from the vehicle speed sensor 12 and a relative speed of the object with respect to the own vehicle.

The position detection section 24 determines a relative position of the object with respect to the own vehicle based on the distance between the own vehicle and the object determined by the object detection section 22 and the direction with respect to the own vehicle in which the object is present.

If the object detection section 22 detects a roadside object, the group formation section 26 groups, as shown in FIG. 2, a plurality of roadside objects 200 to form a roadside object group 202. The plurality of roadside objects 200 are respective detection points corresponding to respective objects detected by the millimeter-wave radar 14 or respective detection points corresponding to portions of a single continuous object such as a guardrail detected by the millimeter-wave radar 14.

The roadside object detected as the detection points is not limited to a guardrail but may be a curb, a building, or the like.

The group formation section 26 sets an approximation straight line 204 approximating positions of the roadside objects 200 of the roadside object group 202. For example, the group formation section 26 sets the approximation straight line 204 so that the sum of squares of each distance between the approximation straight line 204 and each of the roadside objects 200 is the smallest. As shown in FIG. 3, even when the approximation straight line 204 of the roadside object group 202 is at an angle with respect to the traveling direction 102 of an own vehicle 100, the group formation section 26 sets, as in FIG. 2, the approximation straight line 204 approximating positions of the roadside objects 200 of the roadside object group 202.

Figure 4:
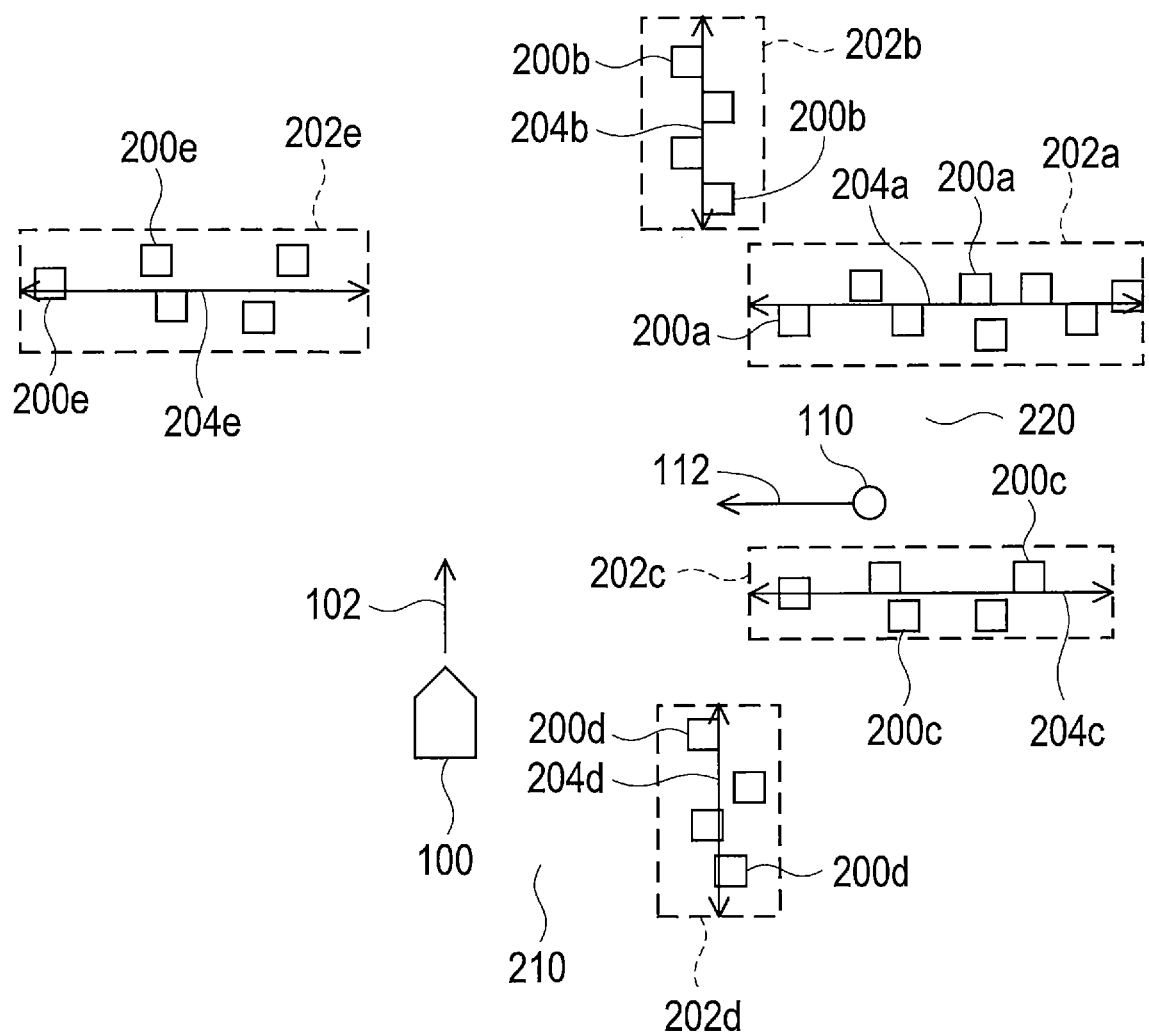
FIG. 4 is a schematic diagram illustrating formation of roadside objects.

As shown in FIG. 4, the group formation section 26 selects roadside objects forming the roadside object groups 202a, 202b, 202c, 202d, and 202e, based on at least one of distances between roadside objects 200a, 200b, 200c, 200d, and 200e denoted by the same reference sign, positions of the roadside objects 200a, 200b, 200c, 200d, and 200e, respective errors between the positions of the roadside objects 200a, 200b, 200c, 200d, and 200e and the approximation straight lines 204a, 204b, 204c, 204d, and 204e, and lengths of the roadside object groups 202a, 202b, 202c, 202d, and 202e in the direction intersecting with the approximation straight lines 204a, 204b, 204c, 204d, and 204e.

For example, the roadside object 200c separated from the roadside object 200a of the roadside object group 202a at a predetermined distance or more is excluded from the roadside object group 202a.

The roadside object 200c whose position is separated from the approximation straight line 204a of the roadside object group 202a at a predetermined distance or more is excluded from the roadside object group 202a.

The roadside object 200c separated from the roadside object group 202a in the direction intersecting with the approximation straight line 204a of the roadside object group 202a is excluded from the roadside object group 202a.

The road direction estimation section 28 estimates two directions indicated by the approximation straight line 204a of the roadside object group 202a as road directions of a road. As shown in FIG. 4, when a plurality of roadside object groups 202a, 202b, 202c, 202d, and 202e are present around the own vehicle 100, only a road direction of a road may be estimated on which the probability is high that the own vehicle 100 will intersect with a moving object 110. In FIG. 4, the road direction of a road 220 intersecting with a road 210 on which the own vehicle 100 is traveling is the road direction of a road on which the probability is high that the own vehicle 100 will intersect with the moving object 110.

As shown in FIG. 4, the road direction estimation section 28 may estimate a road direction of the road 220 on which the moving object 110 moves based on only the approximation straight line 204c of the roadside object group 202 closest to the moving object 110 among the plurality of roadside object groups 202a, 202b, 202c, 202d, and 202e.

The reliability calculation section 30 calculates reliability of the road direction estimated by the road direction estimation section 28, based on at least one of the number of detection points of the roadside objects 200 of the roadside object group 202, the length of the roadside object group 202 in the direction indicated by the approximation straight line 204, and an error between the positions of the roadside objects 200 and the approximation straight line 204.

Figure 5:
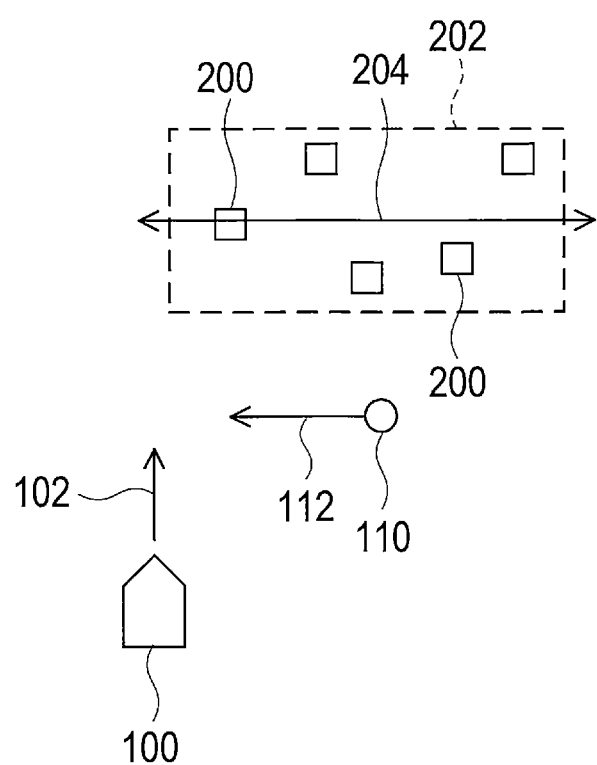
FIG. 5 is a schematic diagram illustrating reliability of a road direction indicated by an approximation straight line of roadside objects.
Figure 6:
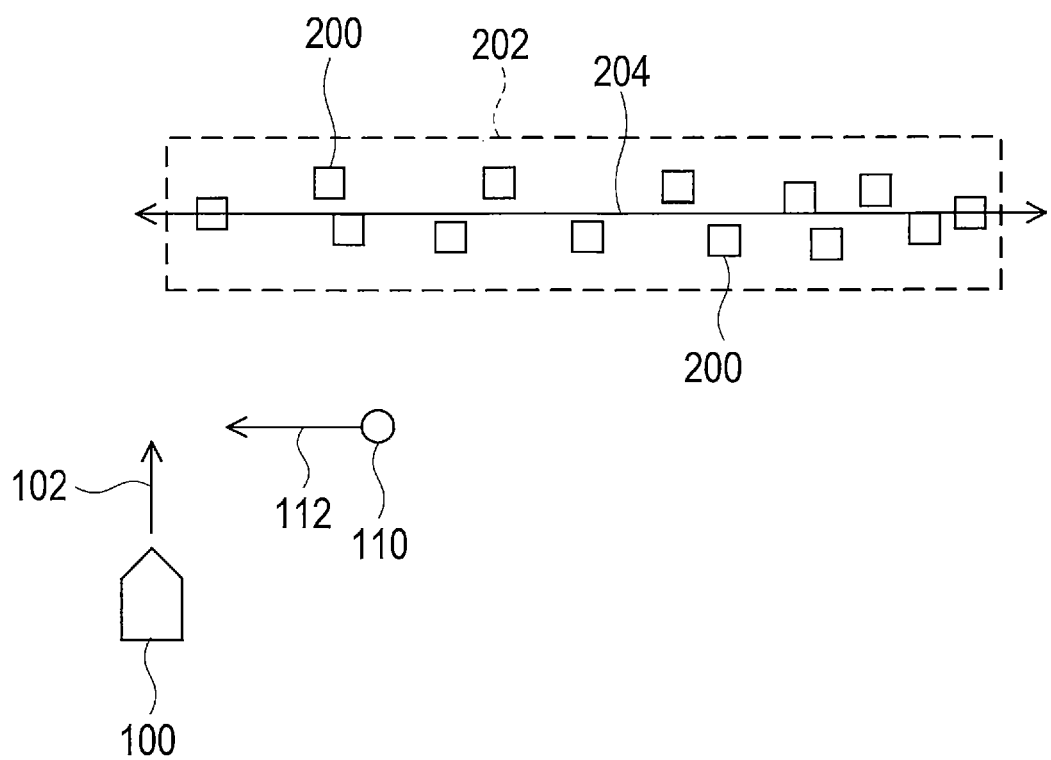
FIG. 6 is a schematic diagram illustrating reliability of a road direction indicated by an approximation straight line of the roadside objects.

For example, when the roadside object group 202 shown in FIG. 5 and the roadside object group 202 shown in FIG. 6 are compared, the number of detection points of the roadside objects 200 of the roadside object group 202 shown in FIG. 6 is larger than the number of detection points of the roadside objects 200 of the roadside object group 202 shown in FIG. 5. In this case, the reliability calculation section 30 calculates reliability of the road direction indicated by the approximation straight line 204 in FIG. 6 so as to be higher than reliability of the road direction indicated by the approximation straight line 204 in FIG. 5.

The length of the roadside object group 202 in the direction indicated by the approximation straight line 204 in FIG. 6 is longer than the length of the roadside object group 202 in the direction indicated by the approximation straight line 204 in FIG. 5. In this case, the reliability calculation section 30 calculates reliability of the road direction indicated by the approximation straight line 204 in FIG. 6 so as to be higher than reliability of the road direction indicated by the approximation straight line 204 in FIG. 5.

An error between the positions of the roadside objects 200 of the roadside object group 202 and the approximation straight line 204 in FIG. 6 is smaller than an error between the positions of the roadside objects 200 of the roadside object group 202 and the approximation straight line 204 in FIG. 5. In this case, the reliability calculation section 30 calculates reliability of the road direction indicated by the approximation straight line 204 in FIG. 6 so as to be higher than reliability of the road direction indicated by the approximation straight line 204 in FIG. 5.

The moving direction estimation section 32 estimates a moving direction 112 of the moving object 110 based on the road direction estimated by the road direction estimation section 28 and a sign of a relative speed of the moving object 110 with respect to the own vehicle 100. For example, if the sign of the relative speed is negative, the moving object 110 is approaching the moving object 110 along the road direction. If the sign of the relative speed is positive, the moving object 110 is receding from the moving object 110 along the road direction.

When the road direction estimation section 28 estimates a plurality of road directions based on the directions of the approximation straight lines 204 of the plurality of roadside object groups 202, the moving direction estimation section 32 recognizes the direction of the approximation straight line 204 of the roadside object group 202 closest to the moving object 110 as a direction of the road on which the moving object 110 moves.

For example, in FIG. 4, the moving direction estimation section 32 recognizes the direction of the approximation straight line 204c of the roadside object group 202 closest to the moving object 110 among the plurality of roadside object groups 202a, 202b, 202c, 202d, and 202e, as a direction of the road on which the moving object 110 moves.

Figure 7:
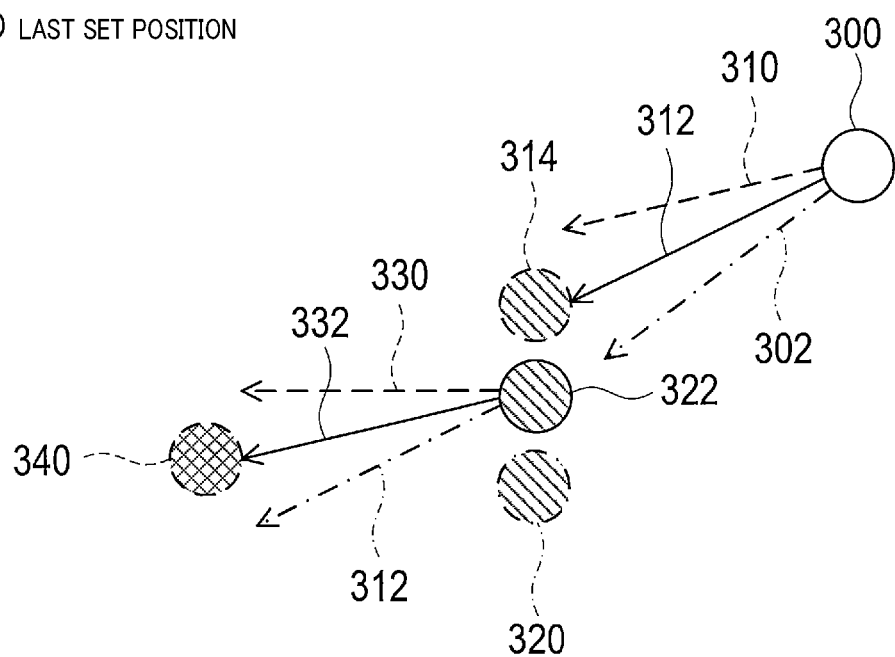
FIG. 7 is a schematic diagram illustrating estimation of a position and a moving direction of a moving object.

As shown in FIG. 7, the filter processing section 34 performs filter processing of a road direction 310 estimated by the road direction estimation section 28 the previous time and a moving direction 302 of the moving object 110 estimated by the filter processing section 34 the previous time but one to estimate a previous moving direction 312 of the moving object 110 by filter processing.

For example, when the reliability calculation section 30 calculates reliability of the road direction 310 estimated by the road direction estimation section 28 the previous time, the filter processing section 34 weights the road direction 310 estimated the previous time and the moving direction 302 of the moving object 110 estimated the previous time but one depending on the calculated reliability of the road direction 310 to estimate the previous moving direction 312 of the moving object 110 by filter processing.

When the road direction 310 estimated the previous time and the moving direction 302 of the moving object estimated the previous time but one have the same weight, the direction halving the angle formed by the road direction 310 estimated the previous time and the moving direction 302 of the moving object estimated the previous time but one is the previous moving direction 312 of the moving object.

The filter processing section 34 estimates a current position 314 of the moving object 110 based on a position 300 of the moving object 110 set the previous time, the moving direction 312 of the moving object 110 estimated the previous time, and a relative speed of the moving object 110. The filter processing section 34 weights the estimated current position 314 of the moving object 110 and a current detected detection position 320 of the moving object to set a current position 322 of the moving object 110 by filter processing.

When the estimated current position 314 of the moving object and the current detected detection position 320 of the moving object have the same weight, the intermediate position between the position 314 and the detection position 320 is the current position 322 of the moving object.

Then, when the reliability calculation section 30 calculates reliability of the road direction 330 estimated by the road direction estimation section 28 this time, the filter processing section 34 weights the road direction 330 estimated this time and the moving direction 312 of the moving object 110 estimated the previous time depending on the calculated reliability of the road direction 330 to estimate the current moving direction 322 of the moving object 110 by filter processing.

Then, the filter processing section 34 estimates a next moving position 340 of the moving object 110 (a position to which the moving object 110 moves next time) based on the position 322 of the moving object 110 set this time, the estimated current moving direction 322 of the moving object, and a relative speed of the moving object 110.

Figure 8:
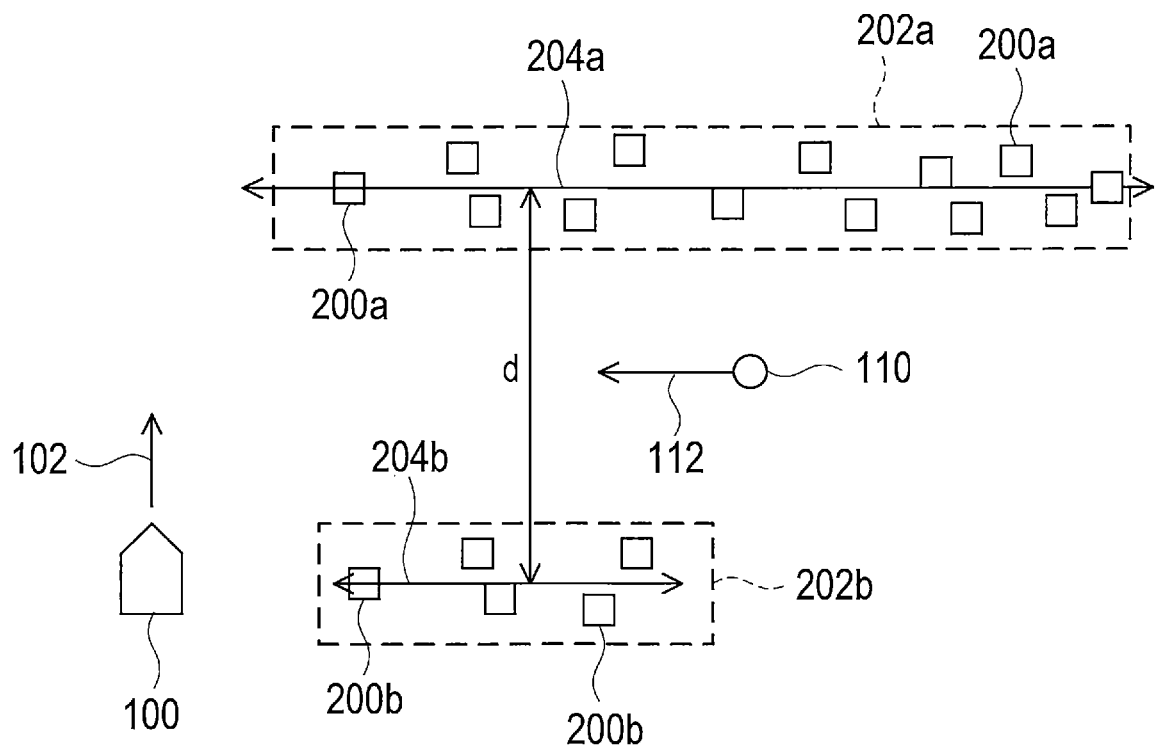
FIG. 8 is a schematic diagram showing a relationship between an interval between roadside objects on both sides of a moving object, and a width of a road.

When estimating a moving position of the moving object 110 (a position to which the moving object 110 moves), as shown in FIG. 8, the filter processing section 34 defines, as a movable range, a road width d between the approximation straight line 204a indicating a road direction of the roadside object group 202a and the approximation straight line 204b indicating a road direction of the roadside object group 202b, the approximation straight line 204a and the approximation straight line 204b being on the both sides of the moving object 110. Then, the filter processing section 34 estimates a moving position of the moving object 110 (a position to which the moving object 110 moves) between the approximation straight line 204a and the approximation straight line 204b.

It is noted that when the object detection section 22 detects the moving object 110 the second time or later, the moving direction estimation section 32 described above uses the moving direction of the moving object 110 estimated by filter processing by the filter processing section 34.

Figure 9:
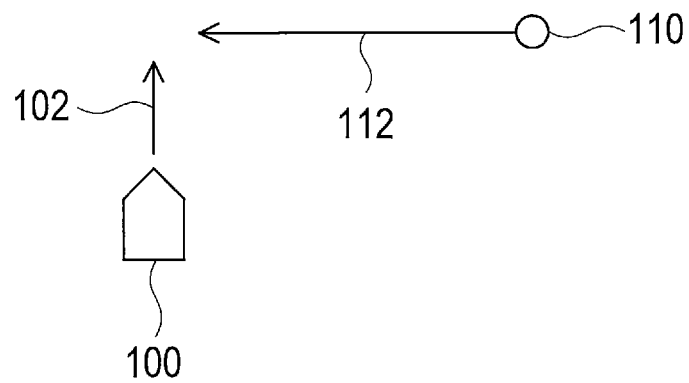
FIG. 9 is a schematic diagram illustrating intersection of the own vehicle and the moving object.

As shown in FIG. 9, when the traveling direction 102 of the own vehicle 100 and the moving direction 112 of the moving object 110 intersect with each other, the notification section 36 issues an alarm via the loudspeaker 40 with a sound or a warning beep, the display 42, or the like.

Figure 10:
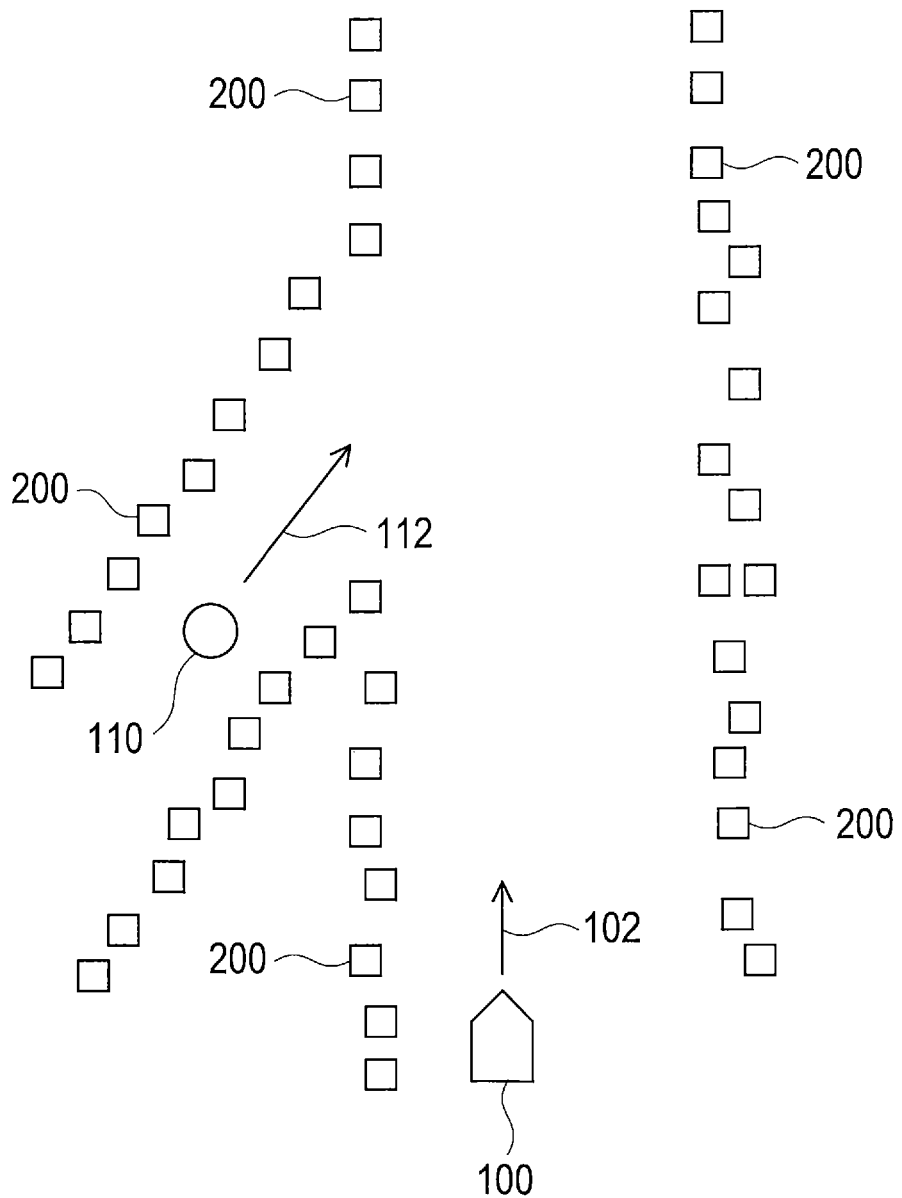
FIG. 10 is a schematic diagram showing an example of intersection of the own vehicle and the moving object.
Figure 11:
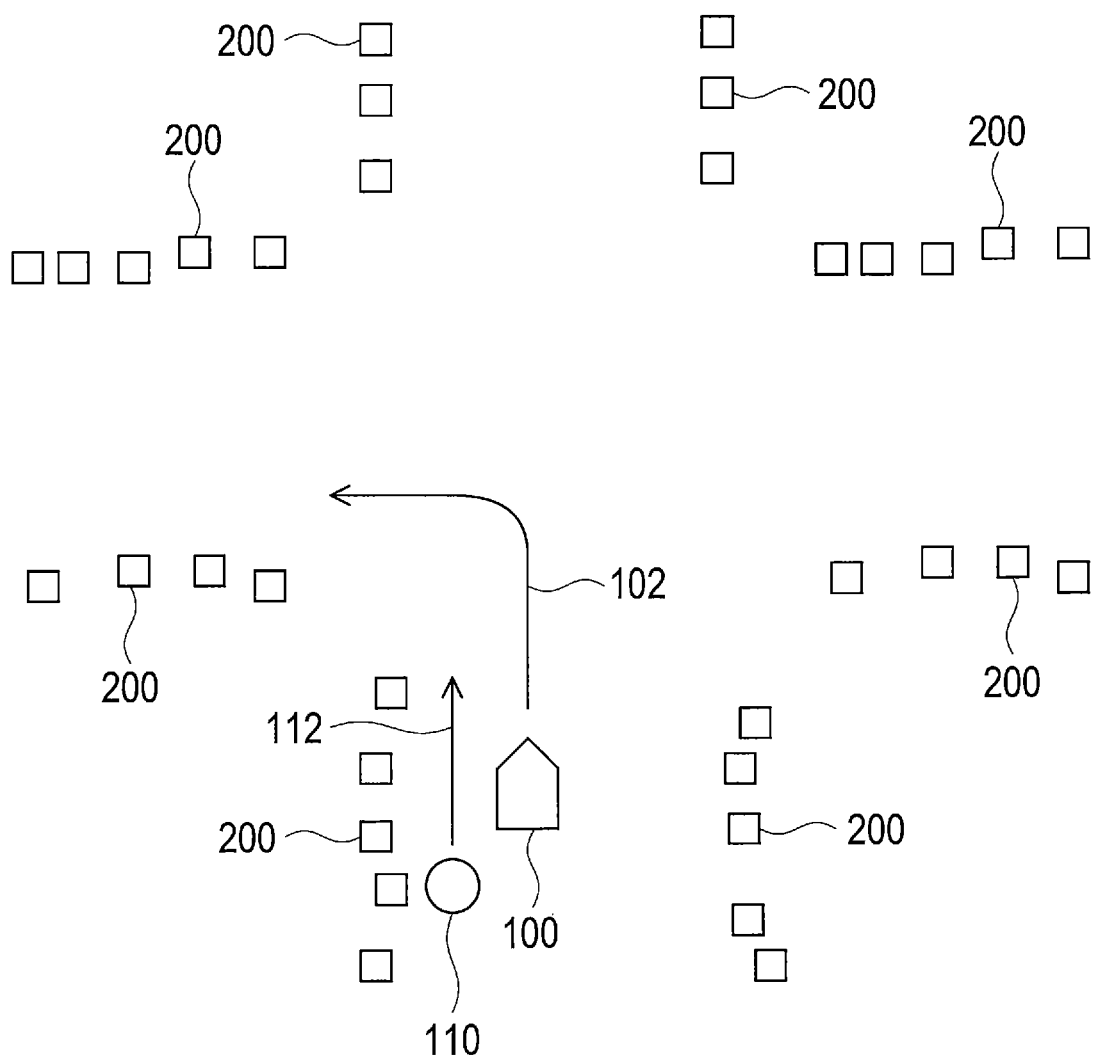
FIG. 11 is a schematic diagram showing another example of intersection of the own vehicle and the moving object.

The notification section 36 issues a notification that the own vehicle 100 and the moving object 110 will intersect with each other, in addition to at an intersection, for example, as shown in FIG. 10, when the moving object 110 will diagonally merge with an expressway on which the own vehicle 100 is traveling, or as shown in FIG. 11, when the moving object 110 is moving at the left rear side of the own vehicle 100 that is going to turn left at an intersection.

[2. Processing]

(1) Moving Object Recognition Process

Figure 12:
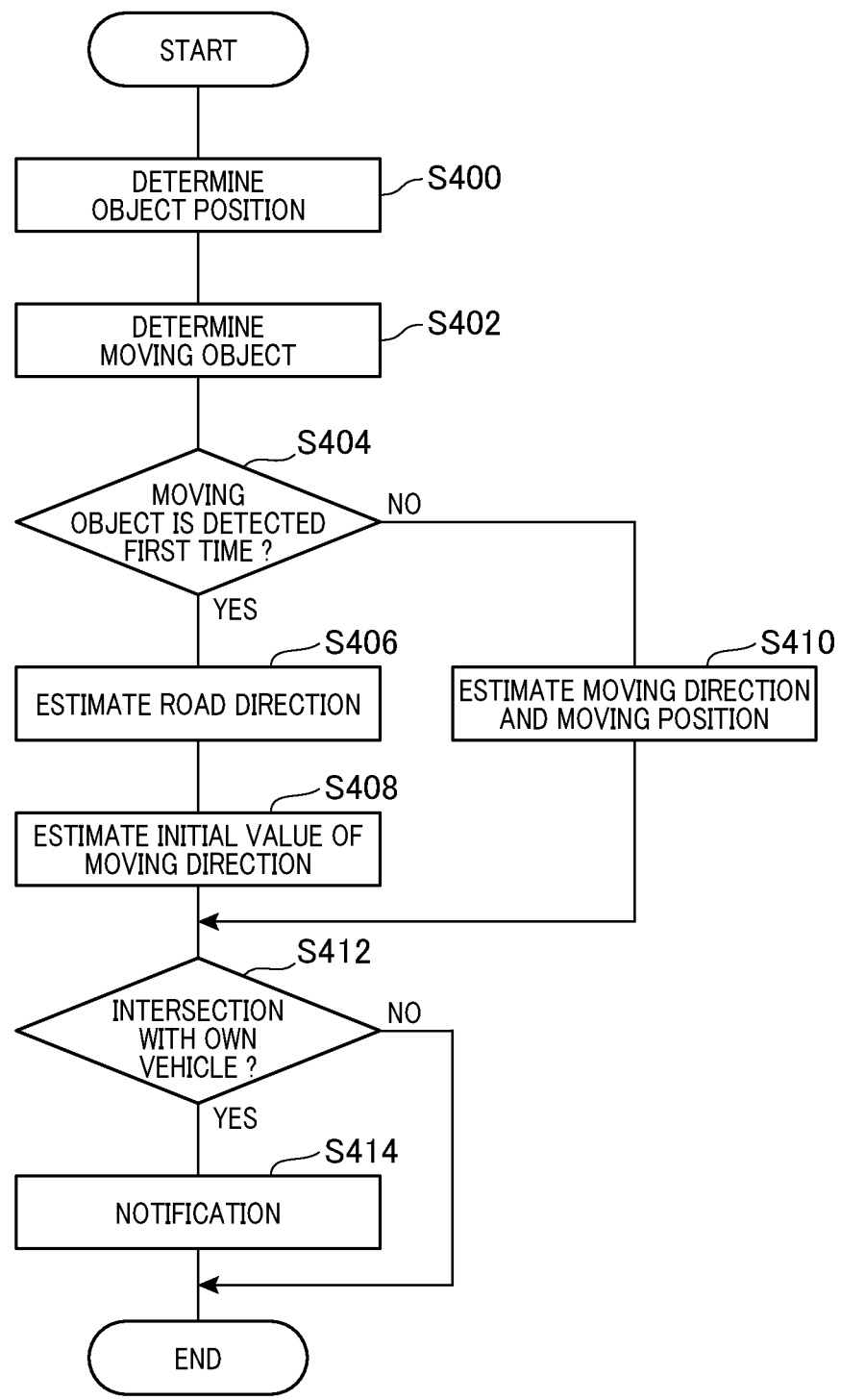
FIG. 12 is a flowchart of a moving object recognition process.

A moving object recognition process performed by the moving object recognition apparatus 20 will be described based on a flowchart shown in FIG. 12.

In S400, the object detection section 22 determines a relative speed of an object present around the own vehicle 100 with respect to the own vehicle 100 based on detection signals from the millimeter-wave radar 14. In addition, in S400, the position detection section 24 determines a relative position of an object with respect to the own vehicle 100, from a distance between the object present around the own vehicle 100 detected by the object detection section 22 and the direction in which the object is present with respect to the own vehicle 100, based on the detection signals from the millimeter-wave radar 14.

In S402, the object detection section 22 determines whether the detected object is a moving object 110 or roadside objects 200 based on the relative speed of the object with respect to the own vehicle 100 and a vehicle speed of the own vehicle 100.

In S404, the object detection section 22 determines whether the detected moving object 110 is an object that is detected first time as a moving object. If the determination result in S404 is No, that is, if the detected moving object 110 has already been detected as a moving object, the process proceeds to S410.

If the determination result in S404 is Yes, that is, if the detected moving object 110 is detected first time as a moving object by the object detection section 22, then in S406, the road direction estimation section 28 estimates a road direction of the road on which the moving object 110 is moving based on the approximation straight line 204 of the roadside object group 202 formed by the roadside objects 200 detected by the object detection section 22. If there are a plurality of moving objects 110 detected first time, the road directions are estimated for the respective moving objects 110.

The details of the estimation process of the road direction in S406 will be described later based on FIG. 13.

When the road direction on which the moving object 110 is moving is estimated by the road direction estimation process in S406, then in S408, the moving direction estimation section 32 estimates an initial value of the moving direction 112 of the moving object 110 based on the road direction on which the moving object 110 is moving and a relative speed of the moving object 110 with respect to the own vehicle 100. Then, the process proceeds to S412.

In S408, when a single road direction is estimated by the road direction estimation process in S406, the moving direction estimation section 32 selects the estimated single road direction as a road direction on which the moving object 110 moves.

When a plurality of road directions are estimated by the road direction estimation process in S406, then in S408, the moving direction estimation section 32 selects the road direction indicated by the approximation straight line 204 of the roadside object group 202 closest to the moving object 110 as a road direction on which the moving object 110 moves.

In S410, the moving direction estimation section 32 estimates the moving direction 112 and a moving position of the moving object 110 (a position to which the moving object 110 moves) by filter processing by the filter processing section 34 described above based on FIG. 7. Then, the process proceeds to S412.

In S412, the notification section 36 determines whether the traveling direction 102 of the own vehicle 100 and the moving direction 112 of the moving object 110 intersect with each other.

If the determination result in S412 is No, that is, if the traveling direction 102 of the own vehicle 100 and the moving direction 112 of the moving object 110 do not intersect with each other, the present process ends.

If the determination result in S412 is Yes, that is, if the traveling direction 102 of the own vehicle 100 and the moving direction 112 of the moving object 110 intersect with each other, then in S414, the notification section 36 issues a notification that the traveling direction 102 of the own vehicle 100 and the moving direction 112 of the moving object 110 intersect with each other, via at least one of the loudspeaker 40 with a sound or a warning beep and the display 42.

(2) Road Direction Estimation Process

A road direction estimation process performed by the moving object recognition apparatus 20 will be described based on a flowchart shown in FIG. 13. The process shown in FIG. 13 is performed in S406 in FIG. 2.

In S420, the group formation section 26 forms the roadside object group 202 present around the moving object 110 based on the roadside objects 200 detected by the object detection section 22.

In S422, the road direction estimation section 28 calculates the approximation straight line 204 approximating positions of the roadside objects 200 of the roadside object group 202. In S424, the road direction estimation section 28 calculates distances between the moving object 110 and a plurality of roadside object groups 202 present around the own vehicle 100. In S426, the road direction estimation section 28 determines the roadside object group 202 that is closest to the moving object 110 and is referred to estimate a moving direction of the moving object 110, based on the distance calculated in S424.

In S428, the road direction estimation section 28 estimates a road direction of the road on which the moving object 110 moves, based on the approximation straight line 204 of the roadside object group 202 that is referred to estimate a moving direction of the moving object 110 determined in S426.

In the road direction estimation process shown in FIG. 13, a single road direction of the road is estimated on which the moving object 110 moves, based on the approximation straight line 204 of the roadside object group 202 closest to the moving object 110. However, the road direction estimation section 28 may estimate a plurality of road directions based on the approximation straight line 204 of all the roadside object group 202 present around the own vehicle 100.

The road direction estimation section 28 may estimate one or more road directions based on the approximation straight line 204 of the roadside object group 202 of the road 220 that intersects with the road 210 on which the own vehicle 100 moves.

[3. Effects]

The embodiment described above provides the following effects.

(1) A road direction of the road is estimated based on the approximation straight line 204 approximating positions of the roadside objects 200 by the road on which the moving object 110 is moving, and a moving direction of the moving object 110 is estimated based on the estimated road direction and a relative speed of the moving object 110.

The moving direction 112 of the moving object 110 is one of the road directions of the road on which the moving object 110 is moving. Then, it can be determined which road direction the moving object 110 is moving in from the relative speed of the moving object 110 with respect to the own vehicle 100. In addition, calculation of the approximation straight line 204 and determination of the relative speed of the moving object 110 can be performed by a single detection process based on detection signals from the millimeter-wave radar 14. Hence, a moving direction of the moving object 110 can be estimated with high responsiveness while high accuracy is ensured.

(2) In a case of a detection process for the moving object 110 the second time or later, the moving direction estimated the previous time and the road direction estimated this time are weighted depending on the estimated reliability of the road direction and are subjected to filter processing. Hence, a current moving direction of the moving object 110 can be estimated with high accuracy depending on the reliability of the road direction.

In the embodiment described above, the millimeter-wave radar 14 corresponds to a sensor that detects a relative speed of an object with respect to the own vehicle.

S400 and S402 correspond to the process of the object detection section 22. S400 corresponds to the process of the position detection section. S406 and S422 to S428 correspond to the process of the road direction estimation section. S408 and S410 correspond to the process of the moving direction estimation section. S410 corresponds to the processes of the reliability calculation section and the filter processing section. S414 corresponds to the process of the notification section. S420 corresponds to the process of the group formation section.

[4. Other Embodiments]

The present disclosure is not limited to the embodiment described above but may be performed with various modifications.

(1) In the above embodiment, a relative speed of the moving object 110 with respect to the own vehicle 100 is determined by a single detection process based on detection signals from the millimeter-wave radar 14. The moving direction 112 of the moving object 110 is estimated by performing a single detection process based on the detected relative speed and the road direction of the road on which the moving object 110 moves.

However, instead of the millimeter-wave radar 14, for example, a LiDAR or a camera may be used as a sensor that cannot detect a relative speed of the moving object 110. LiDAR is an abbreviation for "Light Detection and Ranging".

In this case, since the position of the moving object 110 can be detected based on detection signals from the LiDAR or image data captured by the camera, the direction in which the position of the moving object 110 changes can be detected by performing the detection process twice.

Hence, it can be estimated which road direction the moving object 110 is moving with high responsiveness while high accuracy is ensured, based on the direction of change of the position of the moving object 110 and the road direction of the road on which the moving object 110 is moving.

(2) In the above embodiment, in a case of a detection process for the moving object 110 the second time or later, the moving direction estimation section 32 uses, as the moving direction 112 of the moving object 110, the current moving direction of the moving object 110 estimated by the filter processing section 34 performing filter processing of the moving direction estimated the previous time and the road direction estimated this time.

However, even in the detection process for the moving object 110 the second time or later, the moving direction of the moving object 110 may be estimated based on the road direction of the road on which the moving object 110 moves, and a relative speed of the moving object 110 with respect to the own vehicle 100 or the direction of change of the position of the moving object 110.

(3) In the above embodiment, the approximation straight line 204 of the roadside object group 202 is calculated, and the road direction is estimated based on the direction of the approximation straight line 204. However, the road direction may be estimated based on the longitudinal direction of the roadside object group 202 in which the roadside object group 202 extends.

(4) In the above embodiment, a plurality of functions of a single component may be implemented by a plurality of components, or a single function of a single component may be implemented by a plurality of components. Furthermore, a plurality of functions of a plurality of components may be implemented by a single component, or a single function implemented by a plurality of components may be implemented by a single component. Furthermore, part of the configuration of the embodiment may be omitted. Furthermore, at least part of the configuration of the embodiment may be added to or substituted by another part of the configuration of the embodiment.

(5) The present disclosure can be implemented by, in addition to the moving object recognition apparatus 20 described above, various embodiments such as a moving object recognition system including the moving object recognition apparatus 20 as a component, a program for allowing a computer to function as the moving object recognition apparatus 20, a non-transitory tangible storage medium such as a semiconductor memory storing the program, and a moving object recognition method.

The moving object recognition apparatus (20) of the present disclosure includes an object detection section (22, S400, S402), a position detection section (24, S400), a road direction estimation section (28, S406, S422 to S428), and a moving direction estimation section (32, S408, S410).

The object detection section detects a moving object (110) that moves on a road around an own vehicle (100) and a roadside object (200) by the road, from objects (110, 200) present around the own vehicle (100). The position detection section (24, S400) detects positions of the moving object and the roadside object detected by the object detection section. The road direction estimation section (28, S406, S422 to S428) estimates a road direction of the road on which the moving object is moving, based on the position of the roadside object detected by the position detection section. The moving direction estimation section (32, S408, S410) estimates a moving direction (112) of the moving object based on the road direction estimated by the road direction estimation section.

Since roadside objects are present along a road, a road direction can be estimated based on positions of a plurality of roadside objects. Since the positions of the plurality of roadside objects can be detected by a single detection process, the road direction can be estimated by the single detection process. Since a moving object is moving along the road, it can be estimated which road direction the moving object is moving in with high accuracy based on the road direction estimated by the single detection process.

Which road direction the moving object is moving in can be determined by the minimum number of detections by, for example, detecting the direction of change of the position of the moving object or detecting a relative speed of the moving object with respect to the own vehicle.

Hence, a moving direction of a moving object can be estimated with high responsiveness while high accuracy is ensured.

What is claimed is:

1. A moving object recognition apparatus for an own vehicle, the apparatus comprising:
    a radar that is configured to output transmission waves, and receive reflected waves from objects present around the own vehicle;
    an object detection section that is configured to detect, based on the received reflected waves, a moving object that moves on a road around the own vehicle and a roadside object by the road, from the objects present around the own vehicle;
    a position detection section that is configured to detect positions of the moving object and the roadside object detected by the object detection section;
    a road direction estimation section that is configured to estimate a road direction of the road on which the moving object is moving, based on the position of the roadside object detected by the position detection section; and
    a moving direction estimation section that is configured to estimate a moving direction of the moving object based on the road direction estimated by the road direction estimation section.

2. The moving object recognition apparatus according to claim 1, further comprising
    a group formation section configured to group the roadside objects to form a roadside object group, wherein
    the road direction estimation section is configured to estimate, as the road direction, a direction of an approximation straight line approximating positions of the roadside objects of the roadside object group formed by the group formation section.

3. The moving object recognition apparatus according to claim 2, wherein
    the group formation section is configured to select the roadside object forming the roadside object group based on a distance between the roadside objects, an error between the position of the roadside object and the approximation straight line, and a length of the roadside object group in a direction intersecting with the approximation straight line.

4. The moving object recognition apparatus according to claim 2, wherein
    the moving direction estimation section is configured to estimate the moving direction of the moving object based on a direction of the approximation straight line of the roadside object group closest to the moving object.

5. The moving object recognition apparatus according to claim 1, wherein
    the object detection section is configured to detect a relative speed of the object with respect to the own vehicle from a sensor and detect the moving object and the roadside object based on the relative speed.

6. The moving object recognition apparatus according to claim 5, wherein
    the moving direction estimation section is configured to estimate the moving direction of the moving object based on the road direction and the relative speed.

7. The moving object recognition apparatus according to claim 5, wherein
    the moving direction estimation section is configured to estimate a moving direction of the moving object detected by the object detection section first time, based on the relative speed and the road direction obtained when the object detection section detects the moving object first time.

8. The moving object recognition apparatus according to claim 1, further comprising
    a filter processing section configured to set a current position of the moving object by filter processing based on a current detection position of the moving object detected by the position detection section and a current estimation position of the moving object estimated previous time, estimate a current moving direction of the moving direction by filter processing based on the moving direction of the moving object estimated by the moving direction estimation section previous time and the road direction estimated by the road direction estimation section this time, and set a next position of the moving object based on the estimated current moving direction of the moving object and the current position of the moving object set this time.

9. The moving object recognition apparatus according to claim 1, wherein
    the moving direction estimation section is configured to estimate a road direction of a road intersecting with the road on which the own vehicle travels.

10. The moving object recognition apparatus according to claim 9, further comprising a reliability calculation section configured to calculate reliability of the road direction of the road estimated by the road direction estimation section.

11. The moving object recognition apparatus according to claim 10, wherein
    the reliability calculation section is configured to calculate the reliability based on at least one of the number of detections of the roadside object of the roadside object group, a length of the roadside object group in a direction of the approximation straight line, and an error between the position of the roadside object of the roadside object group and the approximation straight line.

12. The moving object recognition apparatus according to claim 1, further comprising
    a filter processing section configured to set a current position of the moving object by filter processing based on a current detection position of the moving object detected by the position detection section and a current estimation position of the moving object estimated previous time, estimate a current moving direction of the moving direction by filter processing based on the moving direction of the moving object estimated by the moving direction estimation section previous time and the road direction estimated by the road direction estimation section this time, and set a next position of the moving object based on the estimated current moving direction of the moving object and the current position of the moving object set this time, wherein
    the moving direction estimation section is configured to estimate a road direction of a road intersecting with the road on which the own vehicle travels, and
    the filter processing section weights the moving direction of the moving object estimated by the moving direction estimation section previous time and the road direction estimated by the road direction estimation section this time to estimate the current moving direction of the moving object by filter processing.

13. The moving object recognition apparatus according to claim 8, wherein
the filter processing section defines an interval between the roadside objects on both sides of the moving object as a width of the road on which the moving object moves to limit a moving position of the moving object within a range of the width of the road.

14. The moving object recognition apparatus according to claim 1, wherein
the object detection section is configured to detect the object present around the own vehicle based on a detection signal of a radar.

15. The moving object recognition apparatus according to claim 1, further comprising
a notification section configured to issue a notification when the moving direction of the moving object and a traveling direction of the own vehicle intersect with each other.

* * * * *